(12) United States Patent
Mooney (10) Patent No.: US 6,941,156 B2
(45) Date of Patent: Sep. 6, 2005

(54) AUTOMATIC HANDOFF FOR WIRELESS PICONET MULTIMODE CELL PHONE

(75) Inventor: Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 835 days.

(21) Appl. No.: 09/888,493

(22) Filed: Jun. 26, 2001

(65) Prior Publication Data

US 2002/0198020 A1 Dec. 26, 2002

(51) Int. Cl.$^7$ .................................................. H04M 1/00
(52) U.S. Cl. ................................. 455/553.1; 455/552.1
(58) Field of Search ............................. 455/403, 426.1, 455/552.1, 553.1

(56) References Cited

U.S. PATENT DOCUMENTS

| | | | | |
|---|---|---|---|---|
| 5,675,629 A | * | 10/1997 | Raffel et al. ............. | 455/552.1 |
| 5,774,805 A | * | 6/1998 | Zicker ..................... | 455/426.1 |
| 5,794,141 A | * | 8/1998 | Zicker ........................ | 455/418 |
| 5,842,122 A | * | 11/1998 | Schellinger et al. ........ | 455/403 |
| 6,167,278 A | * | 12/2000 | Nilssen ........................ | 455/462 |
| 6,167,285 A | * | 12/2000 | Howe ....................... | 455/552.1 |
| 6,317,582 B1 | * | 11/2001 | Yoshinaga ................. | 455/11.1 |
| 6,363,246 B1 | * | 3/2002 | Williams et al. ............ | 455/403 |
| 6,415,158 B1 | * | 7/2002 | King et al. .............. | 455/552.1 |

* cited by examiner

*Primary Examiner*—Bing Q. Bui (57) ABSTRACT

A technique and apparatus for transferring a communication link between two different modes of a multimode cell phone. For instance, an active telephone call using a cordless telephone RF communication link may be automatically switched (with user prompt if desired) to a cell phone call when desired (e.g., when the cordless telephone goes out of range of its base unit), and vice versa. CallerID Type 2 and Call Waiting may be used to switch the far end telephone from one line to the other with minimal (or even unnoticeable) disruption to the participants or content of the telephone connection.

19 Claims, 6 Drawing Sheets

FIG. 2

CORDLESS TO CELL PHONE HAND OVER

FIG. 5
WALKIE-TALKIE TO CORDLESS HAND OVER

FIG. 6

WALKIE-TALKIE TO CORDLESS HAND OVER

AUTOMATIC HANDOFF FOR WIRELESS PICONET MULTIMODE CELL PHONE

BACKGROUND OF THE INVENTION

1. Field of the Invention

The present invention generally relates to piconet wireless networks. More particularly, it relates to the use of a combination 3-in-1 cell phone/cordless telephone/walkie-talkie device.

2. Background of Related Art

One of the new and useful ideas coming out of BLUETOOTH technology is the 3-in-1 cell phone, where a cell phone has advanced and additional capabilities to operate as a cordless telephone when near a matching cordless telephone base station, or to work as a walkie-talkie when near another similarly capable handset. This provides a cell phone that has advantages over competitors' cell phones which are not similarly capable, including the ability and convenience of storing all phone book data, calling history and user preferences.

Using such systems, a cell phone user has the ability and convenience of accessing a cordless telephone base station when, e.g., arriving home. Having such access, a cordless telephone user might make telephone calls using their cell phone handset accessing their cordless telephone base unit at times when they might not otherwise use their cell phone handset, e.g., when at home in the vicinity of a cordless telephone.

Convenience aside, a 3-in-1 cell phone conventionally provides establishment of a telephone call with a wireless cell phone network, or with a local cordless telephone, depending upon which mode the phone is in. To operate the 3-in-1 cell phone in a cordless telephone mode, the 3-in-1 cell phone is manually switched to a cordless telephone mode by the user, and then a telephone call is made from the base unit. Similarly, to operate a 3-in-1 cell phone in a cellular mode, the 3-in-1 phone is manually switched to a cellular mode, and then a cellular telephone call is established from the handset. To switch between cordless and cellular modes, the user must first terminate any existing telephone call, and then manually switch the mode of the 3-1 telephone.

There is a need in a 3-in-1 cell phone which provides smooth switchover and interaction between separate modes of operation.

SUMMARY OF THE INVENTION

In accordance with the principles of the present invention, a multimode cell phone comprises a cell phone functionality, and an RF communication functionality separate from the cell phone functionality. An automatic switch over module is in communication with both the cell phone functionality and the RF communication functionality. The automatic switch over module operates to switch a communication path established on either the cell phone functionality or the RF communication functionality, with another communication path established on the other of the cell phone functionality and the RF communication functionality.

A method of automatically switching between a first type RF communication link and a second type RF communication link different from the first type RF communication link, comprising participating in the first type RF communication link. An availability of the second type RF communication link is sensed, and if available, the second type RF communication link is established while the first type RF communication link remains active. The parties participating in the first type RF communication link are switched to active utilization of the second type RF communication link.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

More and more home and office devices are designed to form piconets, or small wireless networks. One popular piconet standard is commonly referred to as a BLUETOOTH™ piconet. Piconet technology in general, and BLUETOOTH™ technology in particular, provides peer-to-peer communications over short distances.

The wireless frequency of piconets may be 2.4 GHz as per BLUETOOTH™ standards, and/or typically have a 20 to 100 foot range. The piconet RF transmitter may operate in common frequencies that do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH™ protocols. BLUETOOTH™ network technology may be utilized to implement a wireless piconet network connection (including scatternet). The BLUETOOTH™ standard for wireless piconet networks is well known, described in the BLUETOOTH™ specification, version 1.1, publicly available from the web site www.bluetooth.com. The entire BLUETOOTH™ specification (core and profiles), version 1.1, in particular the Cordless Telephony Profile portion of version 1.1 of the Profiles, is explicitly incorporated herein by reference,.

The BLUETOOTH™ specification defines a Cordless Telephony Profile. In particular, Part K:3 of the BLUETOOTH™ specification version 1.1, Profiles, pages 99–144, defines the features and procedures that are required for interoperability between different cordless telephones, e.g., between remote handsets and corresponding base units.

The '3-in-1' phone is a solution for providing an extra mode of operation to cellular phones, using BLUETOOTH™ as a short-range bearer for accessing fixed network telephony services via a base station. The 3 functions include making telephone calls via a base station (i.e., cordless telephone mode), making direct intercom calls between two terminals (e.g., between two cellular telephone handsets), and, of course, making an otherwise conventional cellular phone call.

The Cordless Telephony Profile defines two roles: Gateway (GW) and Terminal (TL). The Gateway acts as a terminal endpoint from the external network point of view and handles all Interworking towards that network. The Gateway is the central point with respect to external calls, which means that it handles all call set-up requests to/from the external network. The Terminal is the wireless user terminal (e.g., the remote handset of a cordless telephone). The Cordless Telephony profile supports a small number (i.e., less than 7) of terminals, or 3 active voice terminals. In accordance with the principles of the present invention, the multimode 3-in-1 cell phone includes the Cordless Telephony Profile of BLUETOOTH™ capability.

The present invention provides a technique for transferring an active telephone call from cordless telephone mode to cell phone mode (and vice versa) in a 3-in-1 cell phone. In particular, in accordance with the principles of the present invention, CallerID Type2 and Call Waiting are used to switch the far end telephone from one line to the other with minimal (or even unnoticeable) disruption to the participants or content of the telephone connection.

Using conventional 3-in-1 phones, there is no provision for automatically transferring a call from a cordless handset mode to a cell phone mode (e.g., when a user is leaving a household where a matching cordless telephone base unit). Similarly, there is conventionally no automatic way to transfer a telephone call from a cell phone to a cordless telephone base unit when the user returns home. Certainly, a user could manually hang up the 3-in-1 cell phone in one mode (e.g., cordless telephone mode) and initiate a new telephone call using a new mode (e.g., cell phone mode). However, this would require manual operations performed by the user, being a bit of a nuisance to the user prone to error, and also a significant and potentially lengthy disruption to the underlying telephone call.

Figure 1:
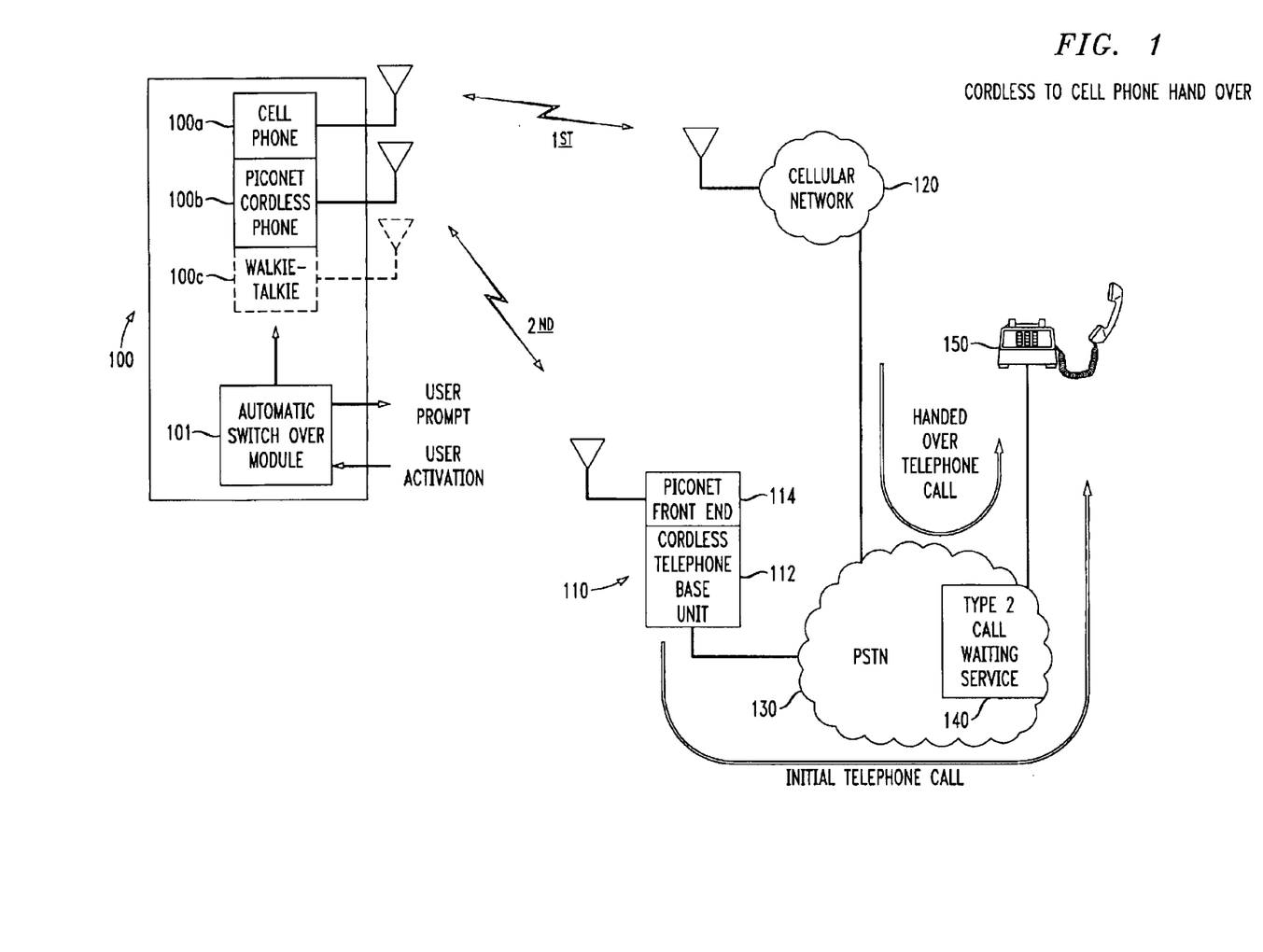
FIG. 1 shows a multimode cell phone handing over a telephone call from a cordless mode to a cellular mode, in accordance with the principles of the present invention.

FIG. 1 shows a multimode cell phone handing over a telephone call from a cordless mode to a cellular mode, in accordance with the principles of the present invention.

In particular, as shown in FIG. 1, a multimode cell phone 100 includes multiple functional modes, e.g., a cell phone mode 100a, a piconet cordless telephone 100b, and a walkie-talkie mode 100c.

Importantly, an automatic switch over module 101 is in communication with each communication path functionality, e.g., with the cell phone functionality 100a, the piconet cordless telephone functionality 100b, and the walkie-talkie functionality 100c. The desired mode of the multimode cell phone 100 may be controlled through suitable communications with each communication path functionality 100a–100c.

Preferably, more than one mode of the multimode cell phone 100 may operate simultaneously, allowing the establishment of a secondary communication path in the background, allowing easy and quick switch over as desired or required. For instance, while operating in a cell phone mode, the automatic switch over module 101 of the multimode cell phone 100 may detect walkie-talkie communication activity from the far party's multimode cell phone 100, and establish a communication link therebetween even while the two parties remain in a cell phone conversation.

In the cordless telephone mode, the multimode cell phone 100 communicates between handset unit 100 and a matching piconet cordless telephone base unit 110 using a suitable piconet front end 114 in the base unit 110 and a matching piconet front end within the multimode cell phone 100.

For explanation purposes, FIG. 1 depicts an established telephone call between the multimode cell phone 100 and a far end telephone 150 (which in the example is a landline telephone accessed through a cellular network). Of course, the far end telephone can be any telephonic device, multimode or single mode.

Once the multimode cell phone 100 extends beyond its acceptable range, the telephone call would ordinarily be dropped, perhaps involuntarily. However, in accordance with the principles of the present invention, the telephone call between the multimode cell phone 100 and the far end telephone 150 is automatically re-established using the cellular network 120. By automatically changing the mode of the multimode cell phone 100 (preferably subsequent to a prompt to the user for permission to transfer), the conversation or other communication between the parties is transferred to the newly established cell phone call.

Figure 2:
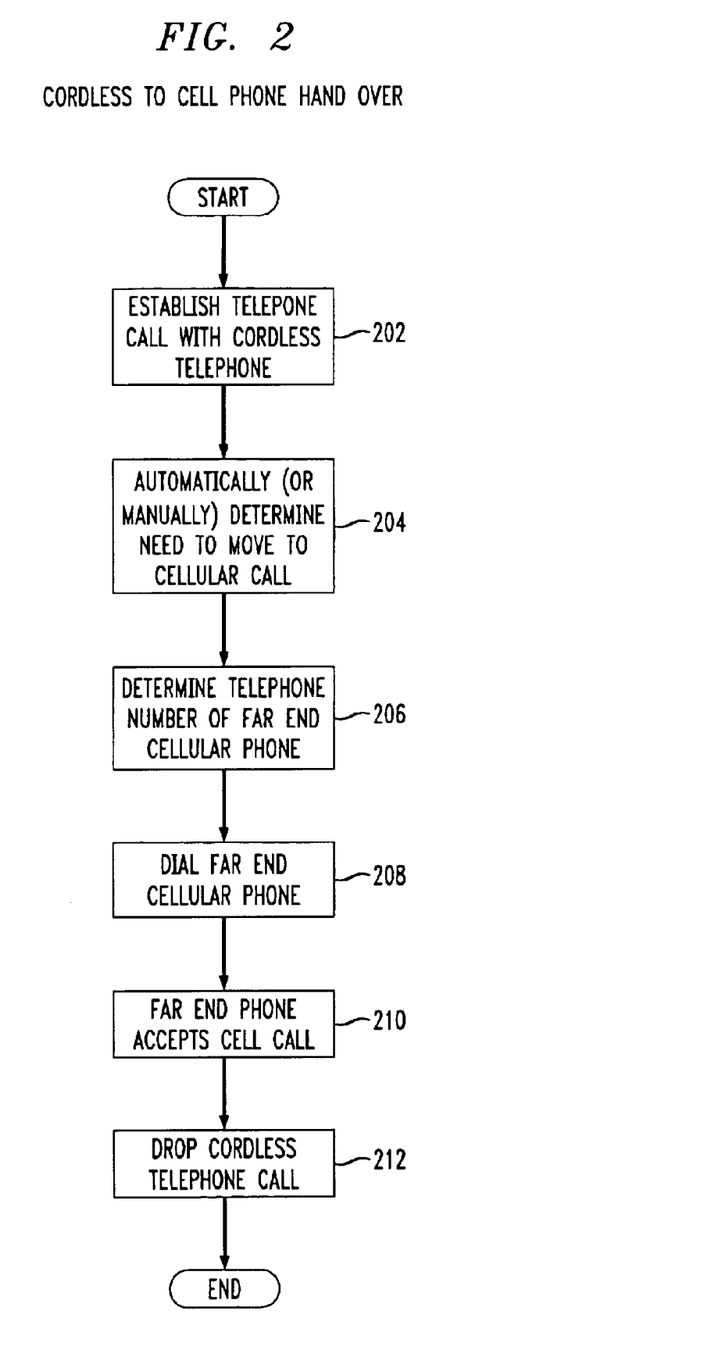
FIG. 2 shows an exemplary process for handing over a telephone call from the cordless mode of a multimode cell phone to a cellular mode of the multimode cell phone, in accordance with the principles of the present invention.

While FIGS. 1 and 2 depict the transfer of a telephone call from a cordless telephone call to a cellular telephone call, the converse is preferably also possible. For example, a person using a cell phone having 3-in-1 capability in accordance with the principles of the present invention is on their way home while talking on their 3-in-1 cell phone in cellular (or other wireless network) mode. Assume that that person then arrives at their home and becomes within range of the cordless telephone base station that is matched to the cordless telephone mode of the 3-in-1 cell phone.

In accordance with the principles of the present invention, an automated procedure may be initiated by the user of the multimode cell phone 100 at the press of a designated button. The user may be prompted about impending loss of signal or otherwise loss of the established telephone call, and may be prompted to permit establishment of and ultimately transfer to an alternative type communication path (e.g., a cellular phone call). In response, the user preferably activates a suitable button, e.g., a dedicated button called, e.g., "Switch to Cell Network", or simply "Switch Communication Path". Of course, the transfer may be entirely automated without requiring input from the user, within the scope of the invention.

FIG. 2 shows an exemplary process for handing over a telephone call from the cordless mode of a multimode cell phone to a cellular mode of the multimode cell phone, in accordance with the principles of the present invention.

In particular, as shown in step 202 of FIG. 2, a cordless telephone call is established using a cordless telephone mode of the multimode cell phone 100.

In step 204, the need (or desire) to change communication modes to a cellular mode is determined.

In step 206, the telephone number of the far end telephone 150 (or another suitable phone accessible to the far end party) is determined, e.g., using a call related information service such as a CallerID type service provided by the PSTN 130 (FIG. 1).

In step 208, the determined telephone number of the far end telephone 150 is dialed, and passes through to the far end telephone 150 using, e.g., a Call Waiting type service 140.

In step 210, the user of the far end telephone 150 accepts the newly incoming telephone call in response to their Call Waiting and/or Type 2 CallerID service.

In step 212, the old communication path (in this case the cordless telephone call) is dropped, perhaps after a desirable delay (e.g., after 5 seconds).

The converse of the example of FIGS. 1 and 2 is also possible. For instance, the multimode cell phone 150 may move from a cell phone call to a cordless telephone call, e.g., once the multimode cell phone 100 becomes within range of its matching base unit 110. In this case, the multimode cell phone 100 automatically establishes a wireless connection with the cordless telephone base station 110 using, e.g., a wireless piconet protocol conforming to the BLUETOOTH™ standard. Using the wireless cordless telephone communication path established between the multimode cell phone 150 and its base unit 110, a suitable telephone number relating to the far end party may be determined and passed to the cordless telephone functionality of the multimode cell phone 100.

Preferably, the initial caller in the first telephone call controls the re-establishment of an alternative mode communication path. For instance, in the disclosed embodiment, the far end party's telephone number is obtained by the multimode cell phone 150 that initiated the first telephone call (i.e., who called whom).

Telephone numbers for the far end party may be recalled from a last number dialed functionality of the multimode cell phone 150. However, call related information such as CallerID information may be used to allow a far end party to themselves initiate a communication path mode transfer.

In the event that both parties attempt to initiate a communication mode change (e.g., from cordless to cellular), conventional collision detect and variously delayed retry schemes may be utilized.

The far end party's telephone number may be obtained for transfer between cordless and cellular telephone modes, e.g., from last number dialed memory (if the user initiated the call), or from the last number received in Caller ID memory (if the current call was incoming from the far end party).

In the given example, the cordless telephone base station 110 then goes off hook and dials the telephone number of the far end party, whether or not the far end party initiated the transferred telephone call. In this example, from the far-end user's perspective, the far end user hears that there is a call coming in (e.g., using a Call Waiting service) and may or may not review CallerID information such as the telephone number and/or name of the calling party, before they accept the new call. Using Call Waiting type service, the far end party would accept the new communication mode by simply activating a FLASH button and abandoning the first telephone call (which will eventually be dropped either by the base unit 110 of the calling party such as is shown in step 212 of FIG. 1, or by the telephone company if the telephone company senses a lack of activity on the abandoned telephone call. To this end, the cordless telephone base unit 110 may notify the handset that the new communication path has been established and accepted, allowing the base unit 110 to finally switch the audio path from the cell phone link to the BLUETOOTH™ cordless telephone link and then disconnect the cell phone call.

In a more automated embodiment of a 3-in-1 phone having automatic handoff capability between modes in accordance with the principles of the present invention, the far end phone 150 includes a capability to sense when a switch between communication path modes is occuring on the near end, and if so to automatically activate a flash signal on the telephone line.

The automatic handoff capability may be implemented using a lookup table including entries relating to alternate telephone numbers, e.g., associated cell phone numbers, land line numbers, etc. However, care should be taken to avoid the vulnerability to erroneous communication path switching.

A safer, alternative approach implements a predetermined signaling tone (e.g. a DTMF tone sent from the near end (switching) phone and a detector on the far end phone 150 recognizing it and preparing to flash when the new call comes in. Of course, there could be a combination of both. Let's look at this example.

A person on their way home is talking to a co-worker on their multimode cell phone 100 (in cell phone mode). That person then arrives home and sits down near their cordless base station 110. Preferably, the multimode cell phone 100 maintains a configuration such that when a cordless telephone link (e.g., a piconet BLUETOOTH™ link of good quality) has been established with the cordless base for a given length of time (e.g., for at least two minutes), then the multimode cell phone handset 100 will allow switch over to the cordless telephone call and ultimately drop or terminate the original cell phone call.

To accomplish this, the multimode cell phone 100 may send, e.g., a quick DTMF "7" followed by a DTMF "9" (i.e., representing the characters "SW") notifying the near end user and the far end phone 150 (and user) that a switch is about to happen. The far end phone 150 would remain ready for a switch over for a given length of time, e.g., for 20 seconds. The multimode cell phone 100 makes the alternate phone call as described above. After the far end phone receives the new call, it checks the call related information (e.g., CallerID data) against entries in a suitable lookup table, and if it finds a match, then automatically flashes the telephone line on the original telephone call. The near end phone, as in the first example, is then notified that the second call has gone through, allowing the conversation to continue on a switched over communication path.

In the unlikely event that the switchover does not succeed, the switchover is preferably delayed (e.g., for 10 seconds or more) to allow the users to switch back to the initial telephone call or communication path.

Similar to the above examples, the multimode cell phone 100 may switch from cordless mode to cell phone mode when the user wishes to leave the proximity of the cordless telephone base unit 110. For instance, manual activation of a suitable button, or automatic detection of the quality of the RF link (e.g., the BLUETOOTH™ piconet link) below a preset level may initiate this feature.

The present invention is equally applicable to a 2-in-1 phone as it is to a 3-in-1 or more mode phone. For instance, automatic switching from a walkie-talkie mode can be performed without the need to control a telephone network.

Figure 3:
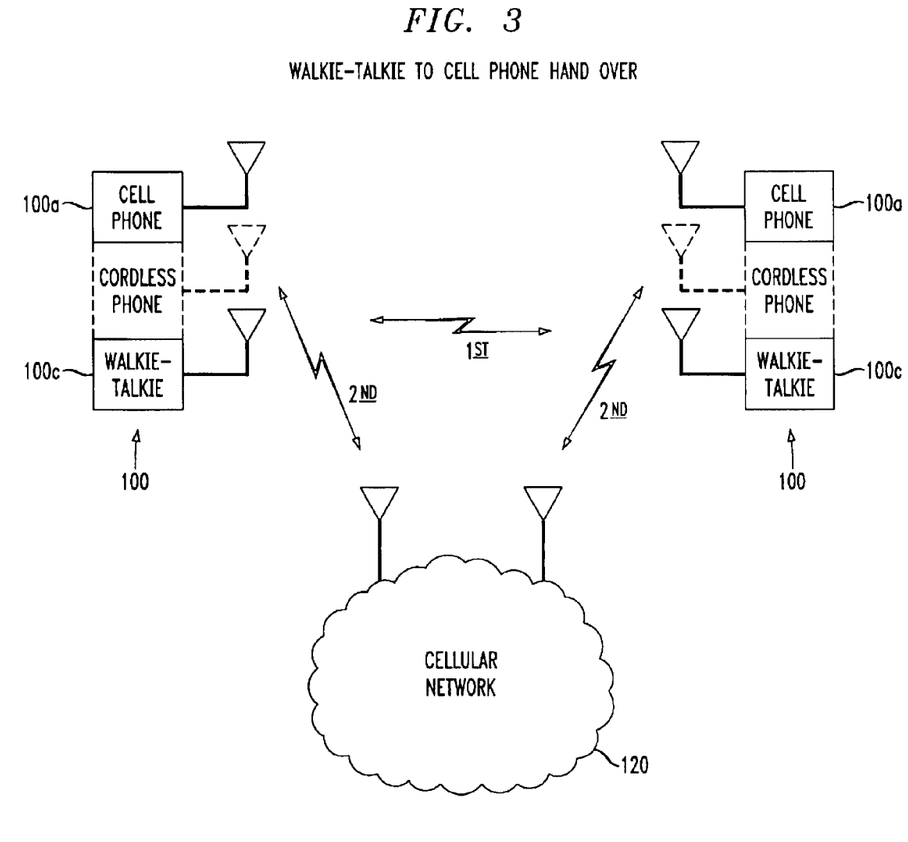
FIG. 3 shows a multimode cell phone handing over a walkie-talkie conversation to a cellular telephone call, in accordance with the principles of the present invention.

For instance, FIG. 3 shows a multimode cell phone 100 handing over a walkie-talkie conversation to a cellular telephone call, in accordance with the principles of the present invention.

In particular, as shown in FIG. 3, a multimode cell phone 100 is initially operating in a walkie-talkie mode over a $1^{st}$ communication path to another multimode cell phone 100. Thereafter, at a desired point (e.g., when the walkie-talkies reach the limit of their range) switchover to the cellular network 120 is initiated, either manually by the user, or automatically but preferably with a prompt to the user before completion.

Figure 4:
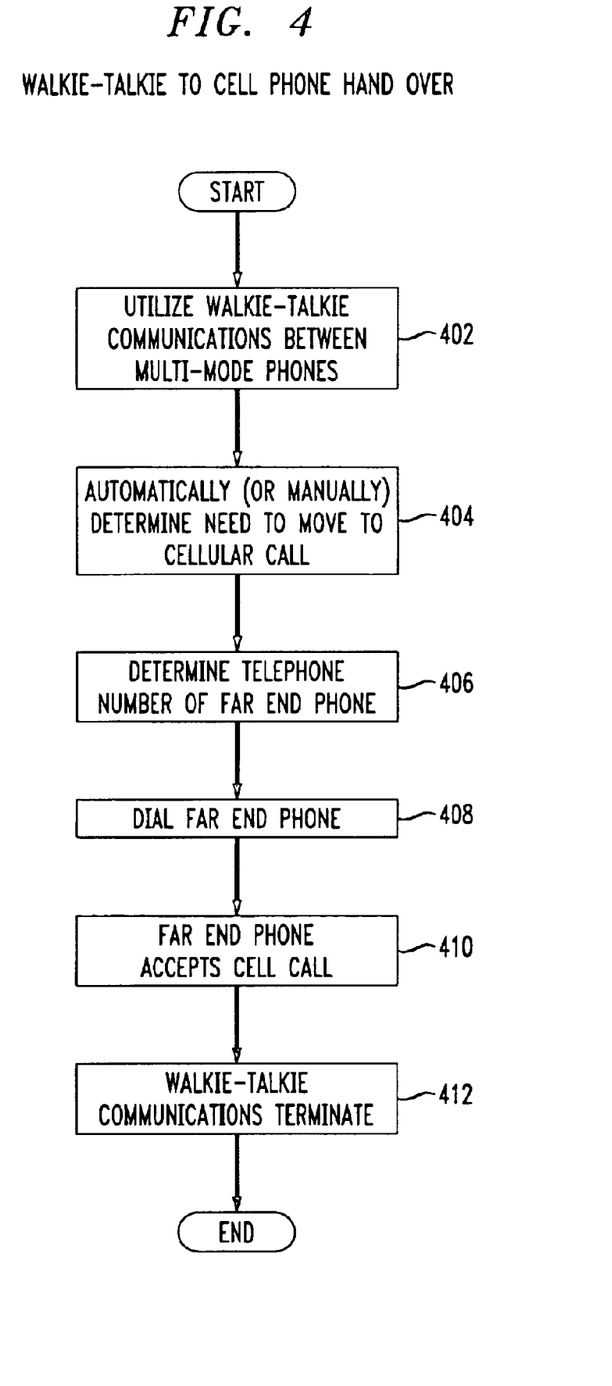
FIG. 4 shows an exemplary process for handing over a walkie-talkie conversation to a cellular telephone call handled by a cellular mode of a multimode cell phone, in accordance with the principles of the present invention.

FIG. 4 shows an exemplary process for handing over the walkie-talkie conversation to the cellular telephone call handled by the cellular mode of the multimode cell phones 100 (or by a separate cell phone at the far end), in accordance with the principles of the present invention.

In particular, as shown in step 402 of FIG. 4, the walkie-talkie modes 100c of the multimode cell phones 100 are utilized.

In step 404, the need to initiate, establish and switch over to another mode (e.g., to a cellular phone call) is determined, either automatically or manually, by an appropriate processor in the multimode cell phone 100.

In step 406, the telephone number of the far end phone is determined.

In step 408, the far end phone is dialed.

In step 410, the far end phone receives and accepts the cell phone call using its cell phone functionality 100a. Call related information such as CallerID may be used by the far end party to assist in their acceptance of the incoming call while conversing using the walkie-talkie modes 100c.

In step 412, after the cell phone call has been established and accepted by the far end party, switchover to the cell phone call can be accomplished, and walkie-talkie communications between the two multimode cell phones 100 can be terminated.

Figure 5:
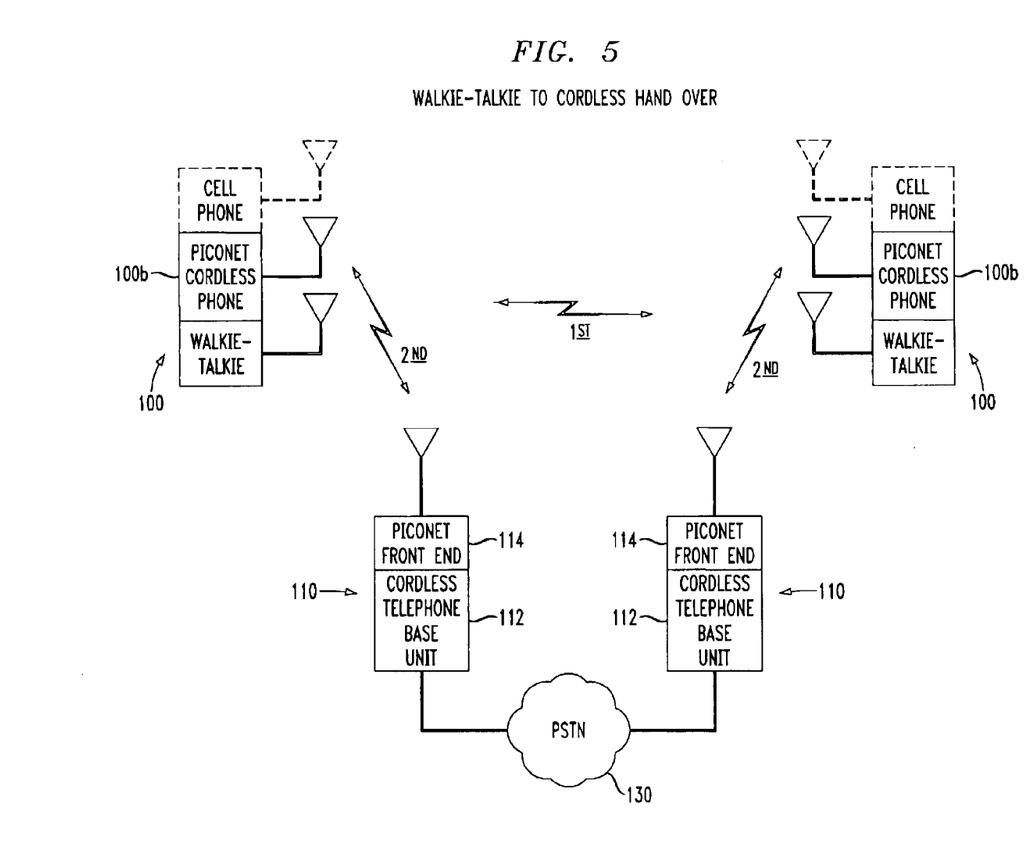
FIG. 5 shows a multimode cell phone handing over a walkie-talkie conversation to a cordless telephone call, in accordance with the principles of the present invention.

FIG. 5 shows a multimode cell phone 100 handing over a walkie-talkie conversation to a piconet cordless telephone call, in accordance with the principles of the present invention.

In particular, as shown in FIG. 5, a multimode cell phone 100 is initially operating in a walkie-talkie mode over a $1^{st}$ communication path to another multimode cell phone 100. Thereafter, at a desired point (e.g., when the walkie-talkies reach the limit of their range) switchover to the cellular network 120 is initiated, either manually by the user, or automatically but preferably with a prompt to the user before completion.

The particular frequency band of operation of the walkie-talkie functionality 100c may be any suitable range, digital or analog. One preferred frequency band and protocol is the Family Radio System (FRS) band, having an operable range of over 1 mile.

Figure 6:
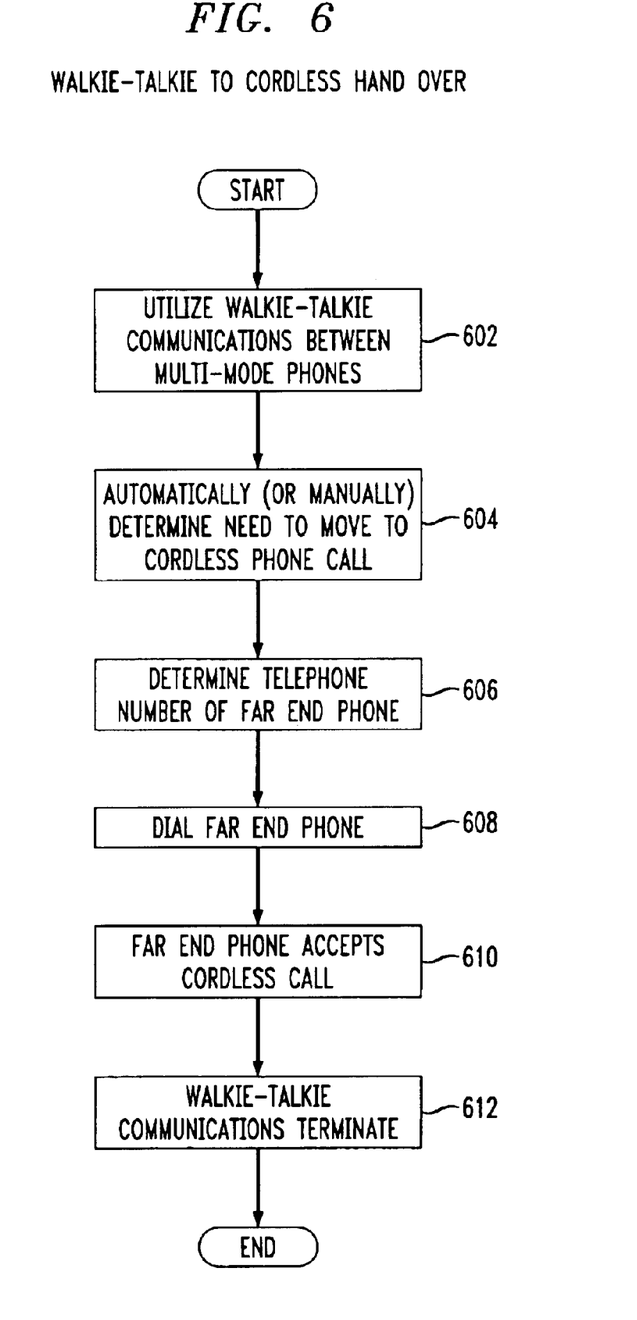
FIG. 6 shows an exemplary process for handing over a walkie-talkie conversation to a cordless telephone call handled by a cordless telephone mode of a multimode cell phone, in accordance with the principles of the present invention.

FIG. 6 shows an exemplary process for handing over the walkie-talkie conversation to the cellular telephone call handled by the cellular mode of the multimode cell phones 100 (or by a separate cell phone at the far end), in accordance with the principles of the present invention.

In particular, as shown in step 602 of FIG. 6, the walkie-talkie modes 100c of the multimode cell phones 100 are utilized.

In step 604, the need to initiate, establish and switch over to another mode (e.g., to a cordless telephone call using a piconet cordless telephone) is determined, either automatically or manually, by an appropriate processor in the multimode cell phone 100.

In step 606, the telephone number of the far end phone is determined.

In step 608, the far end cordless telephone is dialed.

In step 610, the far end phone receives and accepts the cordless telephone call using its piconet cordless phone functionality 100b. Call related information such as CallerID may be used by the far end party to assist in their acceptance of the incoming call while conversing using the walkie-talkie modes 100c.

In step 612, after the cordless telephone call has been established and accepted by the far end party, switchover to the cordless telephone call can be accomplished, and walkie-talkie communications between the two multimode cell phones 100 can be terminated.

The present invention has application in any piconet device, including cell phones, laptop computers, cordless telephones, etc.

While the invention has been described with reference to the exemplary preferred embodiments thereof, those skilled in the art will be able to make various modifications to the described embodiments of the invention without departing from the true spirit and scope of the invention.

What is claimed is:

1. A multimode cell phone, comprising:
   a cell phone functionality; and
   an RF communication functionality separate from said cell phone functionality;
   a module to establish simultaneous communication paths from said multimode cell phone using both said cell phone functionality and said RF communication functionality; and
   an automatic switch over module, in communication with both said cell phone functionality and said RF communication functionality, operable to switch a communication path established on one of said cell phone functionality and said RF communication functionality, with another communication path later established on the other of said cell phone functionality and said RF communication functionality.

2. The multimode cell phone according to claim 1, wherein:
   said RF communication functionality is a cordless telephone.

3. The multiphone cell phone according to claim 2, wherein:
   said cordless telephone utilizes a piconet to communicate between a base unit and a matching remote handset.

4. A method of automatically switching between a first type RF communication link at a multimode cell phone and a second type RF communication link at said multimode cell phone different from said first type RF communication link, comprising:
   participating in said first type RF communication link;
   sensing an availability of said second type RF communication link;
   establishing from said multimode cell phone said second type RF communication link while said first type RF communication link remains active at said multimode cell phone; and
   switching parties participating in said first type RF communication link to active utilization of said second type RF communication link.

5. The method of automatically switching between a first type RF communication link at a multimode cell phone and a second type RF communication link at said multimode cell phone different from said first type RF communication link according to claim 4, further comprising, after said switching parties step:
   terminating said first type RF communication link.

6. The method of automatically switching between a first type RF communication link at a multimode cell phone and a second type RF communication link at said multimode cell phone different from said first type RF communication link according to claim 4, further comprising:

prompting a user of said availability of said second type RF communication link.

7. The method of automatically switching between a first type RF communication link at a multimode cell phone and a second type RF communication link at said multimode cell phone different from said first type RF communication link according to claim 4, wherein:

at least one of said RF communication links is a telephone call.

8. The method of automatically switching between a first type RF communication link at a multimode cell phone and a second type RF communication link at said multimode cell phone different from said first type RF communication link according to claim 4, wherein:

said first type RF communication link is a cell phone call.

9. The method of automatically switching between a first type RF communication link at a multimode cell phone and a second type RF communication link at said multimode cell phone different from said first type RF communication link according to claim 8, wherein:

said second type RF communication link is a cordless telephone call.

10. The method of automatically switching between a first type RF communication link at a multimode cell phone and a second type RF communication link at a multimode cell phone different from said first type RF communication link according to claim 9, wherein:

a cordless telephone used to participate in said cordless telephone call utilizes a piconet to communicate between a cordless telephone base unit and a matching remote handset.

11. The method of automatically switching between a first type RF communication link at a multimode cell phone and a second type RF communication link at a multimode cell phone different from said first type RF communication link according to claim 4, wherein:

said second type RF communication link is a walkie-talkie link.

12. Apparatus for automatically switching between a first type RF communication link at a multimode cell phone and a second type RF communication link at a multimode cell phone different from said first type RF communication link, comprising:

means for participating in said first type RF communication link;

means for sensing an availability of said second type RF communication link;

means for establishing said second type RF communication link, when said second type RF communication link is sensed to be available by said means for sensing; and means for switching parties participating in said first type RF communication link to active utilization of said second type RF communication link.

13. The apparatus for automatically switching between a first type RF communication link at a multimode cell phone and a second type RF communication link at said multimode cell phone different from said first type RF communication link according to claim 12, further comprising:

means for terminating said first type RF communication link after said means for switching switches said parties.

14. The apparatus for automatically switching between a first type RF communication link at a multimode cell phone and a second type RF communication link at said multimode cell phone different from said first type RF communication link according to claim 12, further comprising:

means for prompting a user of said availability of said second type RF communication link.

15. The apparatus for automatically switching between a first type RF communication link at a multimode cell phone and a second type RF communication link at said multimode cell phone different from said first type RF communication link according to claim 14, wherein:

said second type RF communication link is a walkie-talkie link.

16. The apparatus for automatically switching between a first type RF communication link at a multimode cell phone and a second type RF communication link at said multimode cell phone different from said first type RF communication link according to claim 12, wherein:

at least one of said RF communication links is a telephone call.

17. The apparatus for automatically switching between a first type RF communication link at a multimode cell phone and a second type RF communication link at said multimode cell phone different from said first type RF communication link according to claim 12, wherein:

said first type RF communication link is a cell phone call.

18. The apparatus for automatically switching between a first type RF communication link at a multimode cell phone and a second type RF communication link at said multimode cell phone different from said first type RF communication link according to claim 17, wherein:

said second type RF communication link is a cordless telephone call.

19. The apparatus for automatically switching between a first type RF communication link at a multimode cell phone and a second type RF communication link at said multimode cell phone different from said first type RF communication link according to claim 18, wherein:

a cordless telephone used to participate in said cordless telephone call is adapted to implement a piconet protocol to communicate between a cordless telephone base unit and a matching remote handset.

* * * * *